United States Patent [19]

Petit

[11] Patent Number: 5,671,348

[45] Date of Patent: Sep. 23, 1997

[54] NON-VITAL TURN OFF OF VITAL OUTPUT CIRCUIT

[75] Inventor: William A. Petit, Claremont, Calif.

[73] Assignee: General Railway Signal Corporation, Rochester, N.Y.

[21] Appl. No.: 473,557

[22] Filed: Jun. 6, 1995

[51] Int. Cl.$^6$ .............................. B61L 27/00; G06F 11/08
[52] U.S. Cl. ........................... 395/180; 371/53; 364/550
[58] Field of Search .................... 395/180, 182.22, 395/750, 184.01; 364/187, 480; 246/125

[56] References Cited

U.S. PATENT DOCUMENTS

| | | | |
|---|---|---|---|
| 4,204,249 | 5/1980 | Dye et al. | 395/750 |
| 4,611,291 | 9/1986 | Hoelscher | 364/550 |
| 4,740,972 | 4/1988 | Rutherford, Jr. | |
| 4,747,041 | 5/1988 | Engel et al. | 395/750 |
| 4,831,521 | 5/1989 | Rutherford, Jr. | |

*Primary Examiner*—Robert W. Beausoliel, Jr.
*Assistant Examiner*—Ly V. Hua
*Attorney, Agent, or Firm*—Ohlandt, Greeley, Ruggiero & Perle

[57] ABSTRACT

A system and method for selectively dealing with failures in a railway signaling and control context such that only an output device or group of devices is turned off, rather than a whole system being shut down.

4 Claims, 1 Drawing Sheet

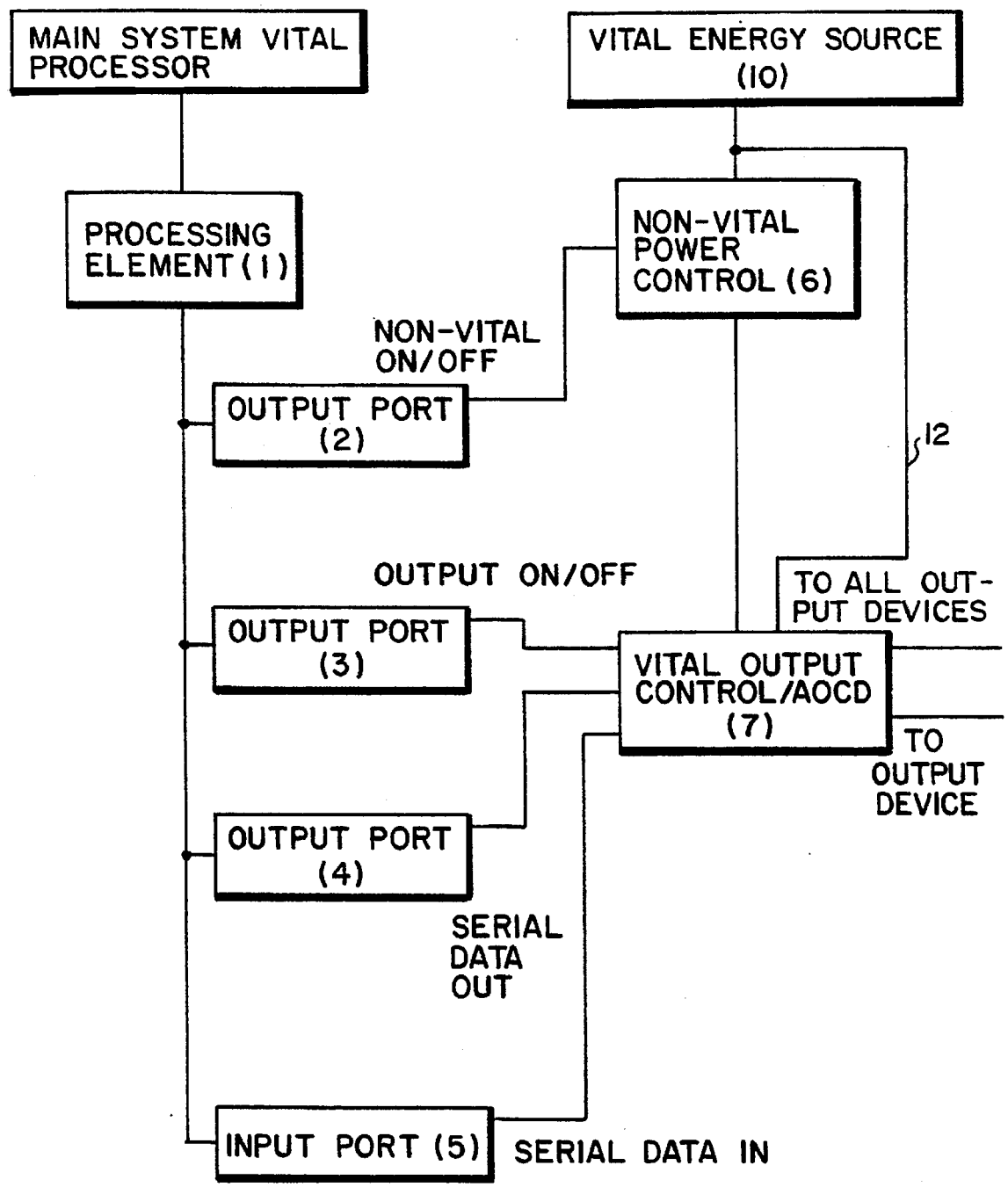

NON-VITAL TURN OFF OF VITAL OUTPUT CIRCUIT

BACKGROUND OF THE INVENTION

This invention relates to railway signaling systems, and particularly to vital interface systems involving, for example, a vital processor which controls vital outputs.

As is well-known in railway signaling and control systems, it is highly desirable that the installations exhibit vital or fail safe characteristics. By vital is meant that the installation is guarded against failures; but if a failure occurs, the failure produces a safe or restrictive mode of operation or control of the traffic. Generally, relay systems have been used for vital signaling and control, and such relays are designed to guard against failures as by having contacts of materials which cannot weld or fuse.

As noted above, vital processors controlling vital outputs have been designed and used for many years in a variety of products such as VPI (Vital Processor Interlocking), Micro-Cabmatic and other products. They are designed such that any failure in them that could potentially create a hazard is detectable and will cause the entire system to go to a known safe state. This is generally accomplished by removing the output power source, that is a vital power or energy source from the output circuit.

The problem which exists in the afore-noted described systems is that the output power source is removed from the system output circuit. Thus, the entire system is effectively safely turned off rather than a selective method being present for localizing the output failure such that only an output device or a group of output devices is turned off.

The problem described above is solved by the present inventions ability to localize and contain the failure which thereby increases the overall system availability precisely because only a small group of output devices, or even a single output device, is turned off in a given instance, leaving the rest of the system available to perform required functions.

It will thus be appreciated that the present invention can be used by any organization or scheme requiring vital outputs and requiring the ability to increase system availability. Moreover, it can be used to retrofit existing applications such as VPI and MicroCabmatic, as well as in new designs. Retrofitting is particularly important in the rail/transit marketplace in which these vital outputs are required or called for. The basic vital output circuit that the present invention is deployed to enhance is described in U.S. Pat. No. 4,611,291, which discloses an interface system providing vital inputs to, and vital outputs from, a vital processor of railway systems for signaling and control purposes; other systems which similarly exploit the basic vital output circuit in U.S. Pat. No. 4,611,291 are disclosed in U.S. Pat. Nos. 4,831,521 and 4,740,972, as well as in other references.

SUMMARY OF THE INVENTION

The present invention builds upon the existing vital output circuit concept in the sense that it improves it by adding circuitry, allowing an individual output device or group of outputs devices to be de-energized in the event of failure, instead of requiring that the entire system be turned off in the event of failure. This feature will be made clear as the disclosure unfolds.

In summary, it is a fundamental advantage of the present invention to be able to localize and contain individual faults, thus increasing the system of availability. Broadly defined, the invention comprises a vital information processing system adapted for railway signaling and control operations and having means for detecting the state of the outputs therefrom, comprising: a vital energy source; a vital processor including (a) a processing means and (b) at least three output ports and an input port forming part of said processor means, and in which a first of said output ports provides a non-vital on/off operation, and a second output port provides a vital on/off operation; a non-vital power control having a first input connected to said first output port and having a second input connected to said vital energy source; a vital output control having a first input connected to said second output port, having a second input connected to said third output port, and having an output connected to said input port; and said vital output control having a third input connected to an output of said non-vital power control; and means for optionally shutting down the entire system, involving all outputs, or shutting down a selected output device, thereby to improve the overall system availability.

Other and further objects, advantages and features of the present invention will be understood by reference to the following specification in conjunction with the annexed drawings, wherein like parts have been given like numbers.

BRIEF DESCRIPTION OF THE DRAWING

The FIGURE features a functional block diagram of the system operation.

DESCRIPTION OF PREFERRED EMBODIMENTS

Referring now to the FIGURE of the drawing, there is seen a processing element or means 1, forming part of and communicating with a system vital processor, as for example, the vital processor 14 shown in U.S. Pat. No. 4,611,291, the details of which patent are incorporated herein by reference. The processing means 1 is typically located on a different printed circuit board within a system module or in a separate system module controller. The processing means 1 might take the form of a variety of typical microprocessors known in the art which have central processing units and memory and are programmed to provide interlocking between signal switches and line circuits. Also, it should be noted that the processing means 1 controls both vital and non-vital outputs. Means, including ports designated 2 through 5, seen in the FIGURE, function as input/output latches for setting outputs or reading inputs. Means 6 functions to receive the non-vital on/off output from means 2 for interrupting a vital energy source 10, seen at the top right in the FIGURE. Means 7 is a power output control AOCD (Absence of Current Detector), whose output goes to a typical output device such as signal switches or line circuits.

It will be understood that means 7, the power output control, can be repeated for each output on a printed circuit board; for example, the VPI implementation uses 8 outputs. Likewise, means 6, the non-vital power control, can be repeated as many times as desired for fault localization. One VPI implementation would have means 6 repeated twice for the ability to non-vitally disable the outputs in groups of 4. It will thus be appreciated that means 2 and 6, in accordance with the invention, are additions to the previously known combination defining the vital output circuit.

In the previous implementation, that is, the implementation known in the art from U.S. Pat. No. 4,611,291, the vital processor 14 would command the local processing means 1 as seen in the FIGURE of this application to turn off an output, such first means being coupled to a second means, i.e., output port 3 of the typical microprocessor to effect the operation of a vital output control means 7. It will be understood that the safety consideration here lies in proving that an output is off when it is commanded to be off since it is not a potential hazard for an output that has been commanded to be on to actually be off due to a circuit failure.

The processing means 1 then relates that command to a signal on output port 3, thereby commanding the appropriate vital output control means 7 to turn the output therefrom to the off state. Such output control means would control the output so as to effectuate the shut down of all output devices, as will be understood, by means of the upper output line. Such output line functions in response to the signal on input line 12.

As part of its normal checking operation, the first means in the form of processing means 1 is continuously causing output port 4 to serially transmit unique codewords through output control means 7, and at the same time processing means 1 inputs the codewords by way of input port 5. If there is output current flowing through a transformer provided as part of vital output control means 7, such transformer is saturated and the unique codeword is not read in through input port 5. For proof that an output is, indeed, off, it is necessary to be able to read the unique codewords or codeword transmitted from output port 4 back in through input port 5.

Also, in the previous implementation known in the art, the processing means 1 collected the codewords received from input port 5 and communicated them to the system vital processor (as for example, vital processor 14 shown in U.S. Pat. No. 4,611,291). When the vital processor determines that the unique codeword is not being received for a output which is expected to be in the off state, it forces the entire system to a known safe state by removing the vital energy source by having a relay, as for example, relay 20 in U.S. Pat. No. 4,611,291 open the circuit to the vital energy source, seen in the upper right of the FIGURE of this application.

Typically several codewords are necessary to be received by the processing means 1 prior to reporting the state of the output to the system processor. These codewords are combined using polynomial division techniques (as for example, those described in patents such as U.S. Pat. No. 4,740,972) so that a single codeword is reported back to the main system vital processor output.

It will be recognized that the present invention adds an additional method of interrupting the vital power (via control module 6) and by providing additional logic to processing means 1. In accordance with a basic feature of the present invention the processing means 1 detects that input port 5 is not sensing codewords when it should be and then removes vital energy in a selective manner by commanding output port 2 to turn off, by means of non-vital power control 6, the associated source of vital energy which is connected to the non-vital power control 6 and is controlled by it. With the source of vital energy 10 thus disabled, and hence not flowing to the vital output control means 7, such failed output control means 7 will no longer have current flowing in it and thus the proper codewords will now be available to verify that the output is indeed off. With no current flowing in means 7, the lower output line therefrom, designated To Output Device, will cause shut down of a single output device or group of devices.

The present invention is preferably implemented as noted previously by having the processing means in the form of a typical microprocessor such that the control logic for the above sequence can be built directly into the processing means. This allows a non-vital shut off to act quickly enough so that only one of the appropriate codewords is missed being serially received. A "cycle of forgiveness" (see again U.S. Pat. No. 4,740,972) can be added. Such "cycle of forgiveness" allows the system to keep on its normal operation without missing a beat. The processing means would also serve to generate a message to the system controller indicating that a failure has occurred and that proper corrective action should be initiated.

If instead of a microprocessor as the processing means a state machine unit (e.g. ASIC) were utilized, it would be necessary for the system vital processor to determine that an output failure has occurred and to issue the appropriate command and to isolate the proper output or group of outputs. In this event, it may be necessary for the main system vital processor to disable the main vital energy source until the non-vital turn off has taken place. It is possible that a "cycle of forgiveness" may also take place in the main system vital processor, although that depends on specific timing circumstances, since it is necessary to verify that vital energy has been removed prior to the potential on the potentially unsafe event could take place (e.g. a railroad switch machine starts to move). Should it be considered necessary to remove the vital energy source prior to commanding the non-vital power 6 to remove the power, it would cause a system operational disturbance of relatively short (several seconds) before becoming operational again. Even this short delay is a major advantage in operation reliability, especially in the typical application where the system is not manned.

Finally, it will be understood that this invention still operates within the vital requirements inasmuch as the main system vital processor still has the capability to remove the main vital energy source should any of the components within the non-vital system fail.

The invention having been thus described with particular reference to the preferred forms thereof, it will be obvious that various changes and modifications may be made therein without departing from the spirit and scope of the invention as defined in the appended claims.

I claim:

1. A vital information processing system adapted for railway signaling and control operations and having means for detecting the state of the outputs therefrom, comprising:

a vital energy source;

a vital processor including (a) a processing means and (b) at least three output ports and an input port forming part of said processor means, and in which a first of said output ports provides a non-vital on/off operation, and a second output port of said output ports provides a vital on/off operation; and means for optionally shutting down the entire system, involving all outputs, or shutting down a selected output device, thereby to improve the overall system availability, said optionally shutting down means including:

a non-vital power control having a first input connected to said first output port and having a second input connected to said vital energy source; and a vital output control having a first input connected to said second output port, having a second input connected to said third output port, and having an output connected to said input port; and said vital output control having a third input connected to an output of said non-vital power control.

2. A system as defined in claim 1, in which serial data is transmitted out from the output of said third output port, and serial data is transmitted in to said input port from said output of said vital output control.

3. A system as defined in claim 1, in which said processing means is a microprocessor.

4. A system as defined in claim 1, in which said processing means is a state machine.

* * * * *